Oct. 21, 1969   P. BOYRIVEN   3,473,835
BALL OR ROLLER LOCKS
Filed Dec. 14, 1967   3 Sheets-Sheet 1
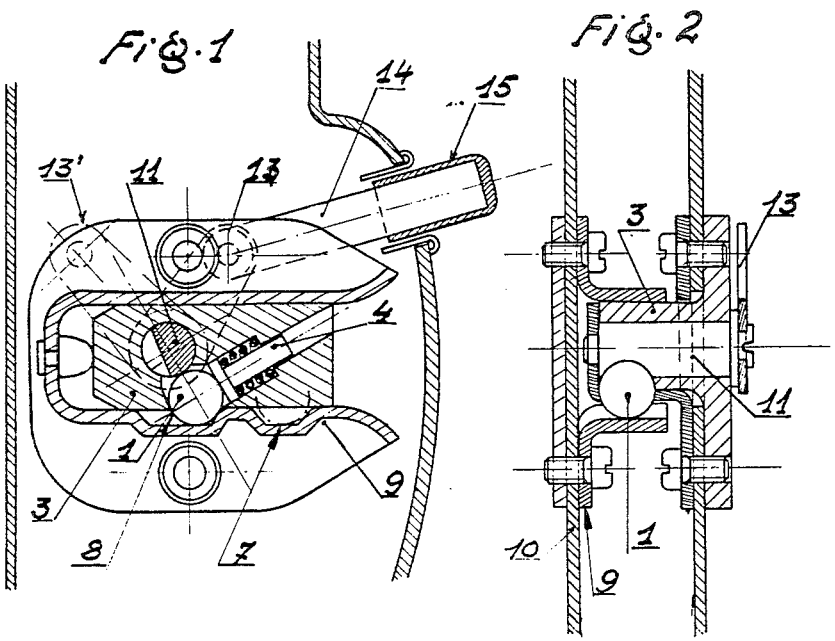
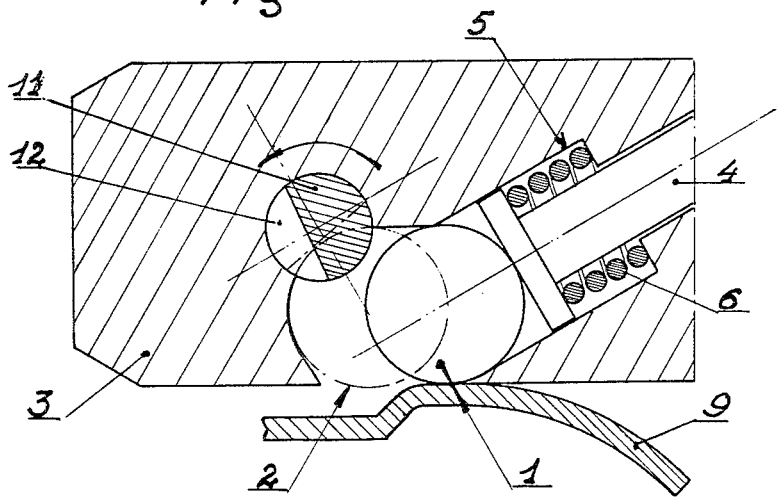
INVENTOR
Paul BOYRIVEN
BY
Raymond A. Robin
ATTORNEY

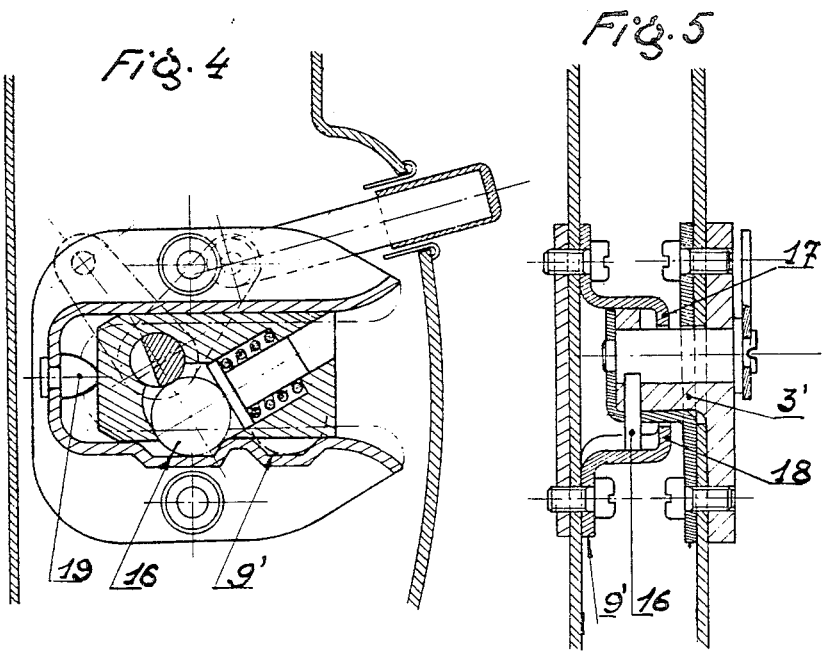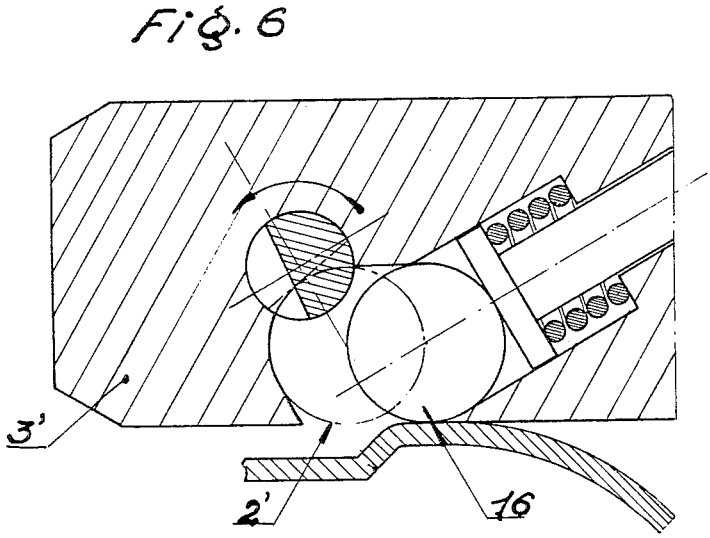

INVENTOR
Paul BOYRIVEN
BY
Raymond A. Robois
ATTORNEY

United States Patent Office 3,473,835
Patented Oct. 21, 1969

3,473,835
BALL OR ROLLER LOCKS
Paul Boyriven, Paris, France, assignor to Compagnie Industrielle de Mecanismes, Courbevoie, France
Filed Dec. 14, 1967, Ser. No. 690,606
Claims priority, application France, Dec. 16, 1966, 87,675; Nov. 29, 1967, 130,166
Int. Cl. E05c *19/06, 1/08;* E05b *15/00*
U.S. Cl. 292—261                                                    6 Claims

ABSTRACT OF THE DISCLOSURE

A lock, particularly for the door of a vehicle, in which a keeper pin is inserted into a keeper formed with a pin chamber the sides of which act as guiding ramps for the pin. One such ramp has locking recesses for the reception of a ball or roller lodged in a housing formed in the pin. The housing has an opening facing the locking recesses and the ball or roller is smaller than the housing but larger than the aperture in such a way as to portrude from the pin and to be inserted in one of the locking recesses in closed condition of the lock. A spring loaded pusher biases the ball or roller against the housing aperture and a cylindrical thrust member is rotatable to abut against the roller or ball to lock it into the aperture. This thrust member is partially hollowed out so that rotation thereof releases the ball or roller for retraction into the housing.

In another embodiment, the locking recesses are provided on the keeper pin and the ball is received in a housing formed in the keeper itself. The spring is replaced by a resilient blade, preferably made of plastic material along with the keeper, and the thrust member is a spring loaded rotatable circular sector which, in closed position of the lock, abuts against the roller and is rotatable against its spring to free the roller when the lock is to be opened.

---

The invention relates to closing devices forming locks particularly for the doors, hoods or trunks of vehicles, for instance, and is essentially characterized by the new combination of a ball or a roller with thrust members and ramps, the interaction of which in appropriate angular conditions results in easy clamping and unclamping between the movable and stationary elements whereas locking and unlocking thereof are as easily obtained by means of a rotating thrust member in the shape of a cylinder portion under the action of some actuating or control device.

The invention will be better understood by the description that follows of preferred embodiments thereof having reference to the appended drawing wherein:

FIGURE 1 is a longitudinal cross-section view of the edge of an automobile door provided with a locking device having a keeper, according to the invention, shown in final closed position;

FIGURE 2 is a transverse cross-sectional view of the assembly of FIGURE 1, through the area where the locking ball engages;

FIGURE 3 is a partial enlarged view of FIGURE 1 but showing the locking ball as it approaches the first locking recess of the keeper;

FIGURE 4 is a longitudinal cross-sectional view similar to that of FIGURE 1 but of a different embodiment where the locking ball is replaced by a roller and in combination with the lateral safety holder;

FIGURE 5 is a transverse cross-sectional view of the embodiment of FIGURE 4 in the region where the roller locks into the keeper;

FIGURE 6 is a longitudinal cross-sectional view, on a larger scale, taken in the region where the roller locks into the keeper;

Figure 7:
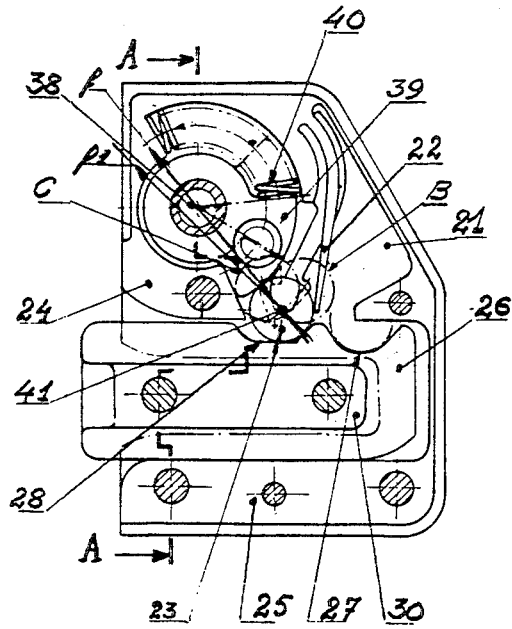
FIGURE 7 is a view in elevation of a roller lock in engagement with the keeper thereof and wherein the inner plate of the lock and the keeper plate are supposedly withdrawn.

A first embodiment of a lock and keeper according to the invention is shown in FIGURES 1 and 3 and is essentially characterized by the interlocking of the said elements by means of a conventional steel ball 1 movable in an enlarged housing 2 of a keeper pin 3 under the antagonistic action of a piston or pusher 4 sliding in an inclined hole 5 and returned by a compression spring 6 successively co-acting with ramps namely defining two recesses 7 and 8 of a keeper 9 having the general shape of a U.

Keeper 9 is secured on the frame of a door 10. A cylindrical thrust member 11 is housed in the keeper pin 3 of the lock and is formed with a hollow 12, rotation of the cylindrical thrust member 13 being obtained by means of a lever 13 secured to the rotatable thrust member 11 and connected at one end to the end of a link 14 to be actuated by a push button 15 whereby actuation of the push button 15 either causes locking or release of the ball 1.

With the above-mentioned combination of mutually appropriate means, it will be understood that as soon as the keeper pin 3, and more specifically its ball 1, comes in contact with the inlet ramps of the keeper 9, during closure of the door, the ball 1 is pushed back as well as its pusher 4 by compressing the spring 6 which, because of this fact and by reason of the continuous closure motion, will tend in turn to push the ball 1 first in recess 7 in the so-called safety hooking position and then in recess 8 in position of complete closure of the door.

In this final closure position of the door illustrated in FIGURE 1, rotation of the cylindrical thrust member 11 in its position of rest will prevent any risk of untimely disengagement of the ball 11. This disengagement is only possible after a pre-rotation of the cylindrical thrust member 11 obtained by rocking of its actuation lever 13 in the position illustrated at 13' where the hollow 12 of the thrust member 11 allows removal of the ball 1 from the successive recesses of the keeper 9 under the action of the pusher 15 and of its link 14 or of any other known actuating means.

The embodiment illustrated in FIGURES 4 to 6 is characterized by the substitution of a roller 16 to ball 1 of the previously described device. This has the advantage to increase the surfaces in contact and to correlatively reduce the pressure on these contact surfaces while the general operation is not changed except with regard to the combination and interactions already described with known means for the lateral holding of the door in closed position, these means constituted for instance by the elbowed or inturned edges such as 17 and 18 of the keeper 9, as illustrated in FIGURE 5. It will easily be understood that the elbowed edges 17 and 18 will thus prevent any risks of the lateral removal of the keeper pin 3' in relation to the keeper 9' thus avoiding any risks that the door untimely open particularly in the case of an accident.

It is important to note that with the new combinations of means and processes just described, new industrial products forming locks are obtained that are characterized by a simplified and economic manufacture while ensuring smoother operation thus rendered more noisily and perfected by an advantageous tendency to self closure, in first safety position, while requiring only a small decondemnation effort.

Furthermore, whether it be a ball or a roller type, the closure member has a small mass and no off-set which makes it possible to avoid counterbalancing by a spring for the control member while giving the possibility to conceive a reaction to the opening force at right angles to the point of application of the force.

Besides, it is appropriate to add that the invention extends the possibilities of miniaturizing thus offered namely in the manufacture of automobile locks and lends itself better to the increasing general tendency to use moldable plastic materials for such manufactures.

Figure 8:
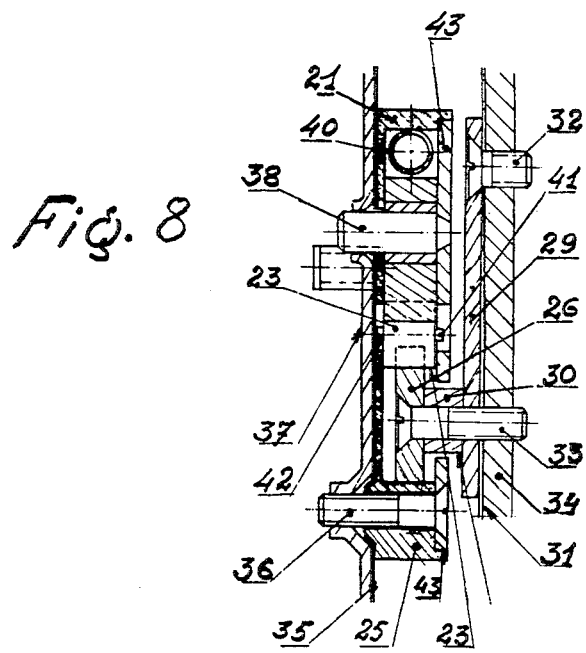
FIGURE 8 is a transverse cross-sectional view according to line A—A of FIGURE 7 and in which the aforesaid plates are supposedly placed back into position.

With reference to FIGURES 7 and 8, there is shown a lock casing 21 advantageously obtained by the molding of some material but preferably in slightly resilient plastic material such as the one commercially known as "Delrin" in such a way as to directly form a leaf 22 acting as a return spring for the closure roller 23.

Casing 21 besides comprises bosses 24 and 25 the rounded front edges of which facilitate the insertion and the centering of the nose 26 of the keeper formed with two successive recesses 27 and 28, respectively, for partial or safety closure and for final closure.

This nose 26, solid with its plate 29 by the interposition of a spacer 30, is secured on the foot or column of the door 31 by such means as screws 32, 33 which thread into the counterplate 34 whereas the lock casing 21 is secured on the edge 35 of the door by means of screws 36 engaging with appropriate threads of the inner plate 37.

The casing 21 again comprises a chamber for both the housing and centering of axle 38 of its rocking sector 39 to which it is secured and of a curved compression spring 40 driving back the assembly in the position of rest whereas rocking in reversed direction is obtained in the usual manner by means, for instance, of a lever acting on the axle 38.

Finally, the clearance of the roller 23 are limited by the insertion of its lateral lugs 41, 42, into appropriate predetermined recesses that are preferably triangular and formed, on the one hand, in the casing 21 and, on the other hand, in the plate 43 of the lock casing 21.

It will easily be understood that, by this combination, if the door and its lock made according to the present invention are brought close to the frame which carries the keeper, because of its rounded edges, the nose 26 will tend to center itself between the bosses 24 and 25 of the lock casing 21 until it lifts the roller 23 in the position B illustrated in broken lines by moving the resilient leaf 22 a corresponding amount.

By continuing this closure movement, roller 23 will first fall in the first recess 27 of the keeper nose 26 resulting in a first locking position called "safety" position whereas by continuing the same movement, the roller 23 will be lifted again to finally fall in the recess 28 for final closure.

In this position, roller 23 will ensure effective locking between its locking sector 39 and its recess 28, namely due to a slight difference in the direction between the reaction of the roller 23 on the sector 39 according to arrow $f$ and its reaction on the keeper according to arrow $f1$ tending at the same time to have it act as a door-wedge.

Of course, it always remains possible to combine the above-described mechanism with any door-wedge device or to reduce such a mechanism to a simple interposition of a slightly resilient material or yet sufficiently resilient, such as an elastomer, between the surface in contact to avoid creation of noises.

To obtain opening, it is sufficient to cause rocking of the axle 39 and thus of its sector 39 counterclockwise, in relation to FIGURE 7, as is usually done and against spring 40 until release of the lifting of roller 23 in the position illustrated by C, also in broken lines, where it is removed from its recesses.

It is also to be mentioned that the mechanism illustrated in the aforementioned figures also creates a lateral holding or retention avoiding the risk of opening in the case of accident by the combination of the spread of the keeper nose 26 by its spacer in such a way as to allow it to be inserted behind corresponding extensions of the recesses in the front plate 43.

It is obvious that the scope of the present invention is not to be limited to the aforedescribed embodiments.

I claim:
1. In a lock for doors, hoods or trunks of a vehicle, the combination comprising:
   (a) a keeper pin formed, along the periphery thereof, with locking recesses in succession axially of said pin;
   (b) a keeper formed with a chamber for the reception of said pin, with a pin inlet opening and with ramps for the guiding of said keeper as it moves over and is removed from over said pin; said keeper having a housing formed with an aperture opening into one of said locking recesses in closed position of said lock;
   (c) a locking member in said housing normally protruding from said aperture and smaller in size than housing but larger than said aperture;
   (d) said housing aperture formed with resilient means on the side thereof opposite said chamber inlet opening and biasing said locking member into the normally protruding position;
   (e) means to hold said locking member in aperture protruding position and in one of said recesses in closed position of said lock.

2. A combination as claimed in claim 1, wherein said locking member is a roller.

3. A combination as claimed in claim 1, wherein said holding means is a spring loaded rotatable circular sector in said housing adapted to abut said locking member in closed condition of said lock and rotatable against the spring thereof to free said locking member for movement inwardly of said housing.

4. A combination as claimed in claim 1, wherein said keeper is made of moldable plastic material and said resilient means is a leaf spring made of resilient plastic material molded integrally with said keeper.

5. A combination as claimed in claim 2, wherein said roller is supported by central lugs centrally thereof, the ends of which extend through triangular recesses formed on opposite faces of said keeper chamber.

6. A combination as claimed in claim 2, wherein said keeper pin is secured to a door post in spaced relationship therewith by means of spacer members narrower than said keeper pin and wherein said keeper has a slot for the insertion of said spacer members, said slot being also narrower than said keeper pin to prevent accidental lateral removal of said pin from said keeper, in closed position of said lock.

References Cited

UNITED STATES PATENTS

| 1,701,932 | 2/1929 | Nelson | 292—252 X |
| 2,210,989 | 8/1940 | Sutherland | 292—252 X |
| 2,383,576 | 8/1945 | Wiley | 292—252 |

MARVIN A. CHAMPION, Primary Examiner

E. J. McCARTHY, Assistant Examiner

U.S. Cl. X.R.

292—252